Sept. 26, 1933. J. VAN MEURS 1,928,191
FRICTION LOCKING DEVICE
Filed Oct. 30, 1930 3 Sheets-Sheet 1
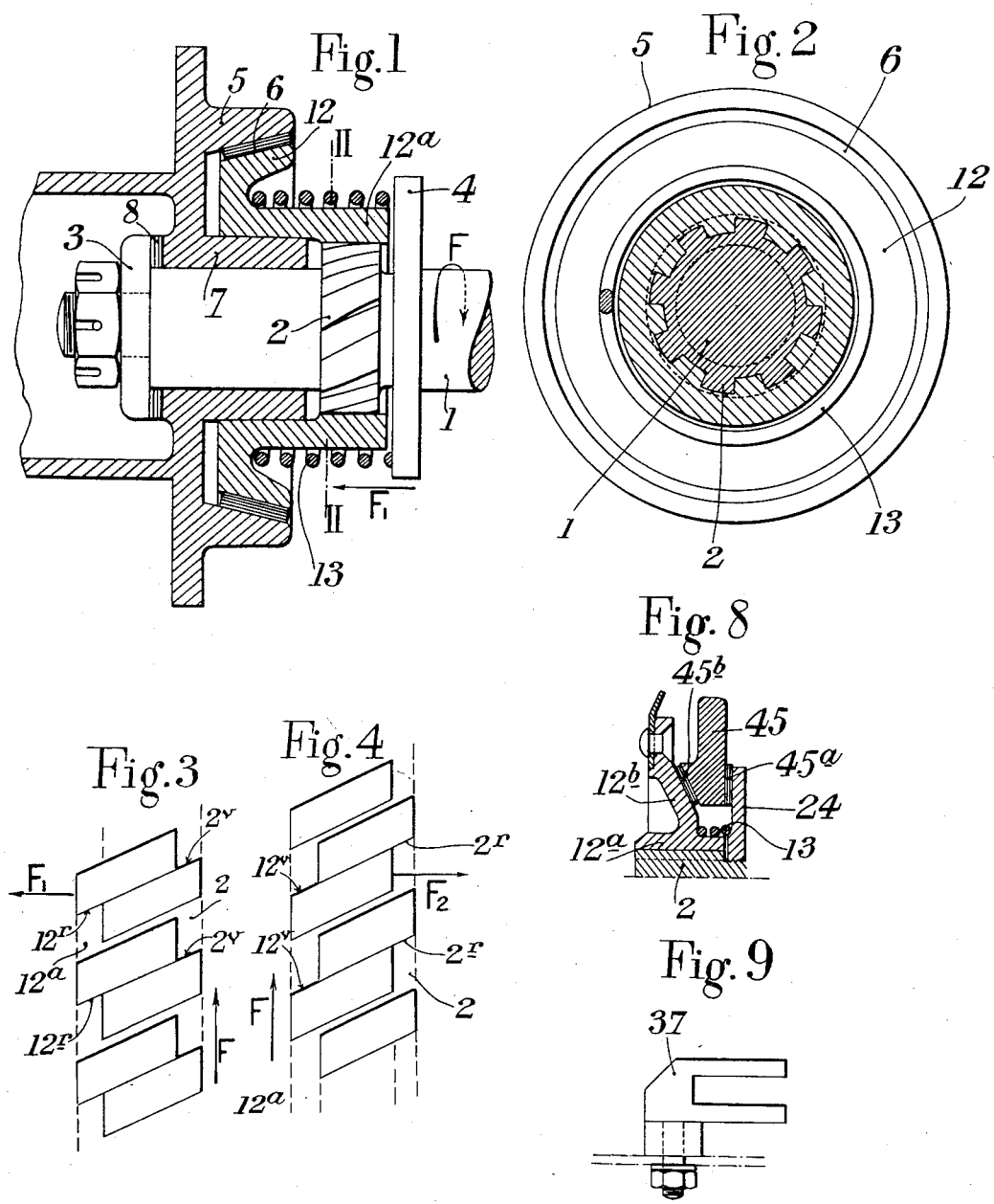

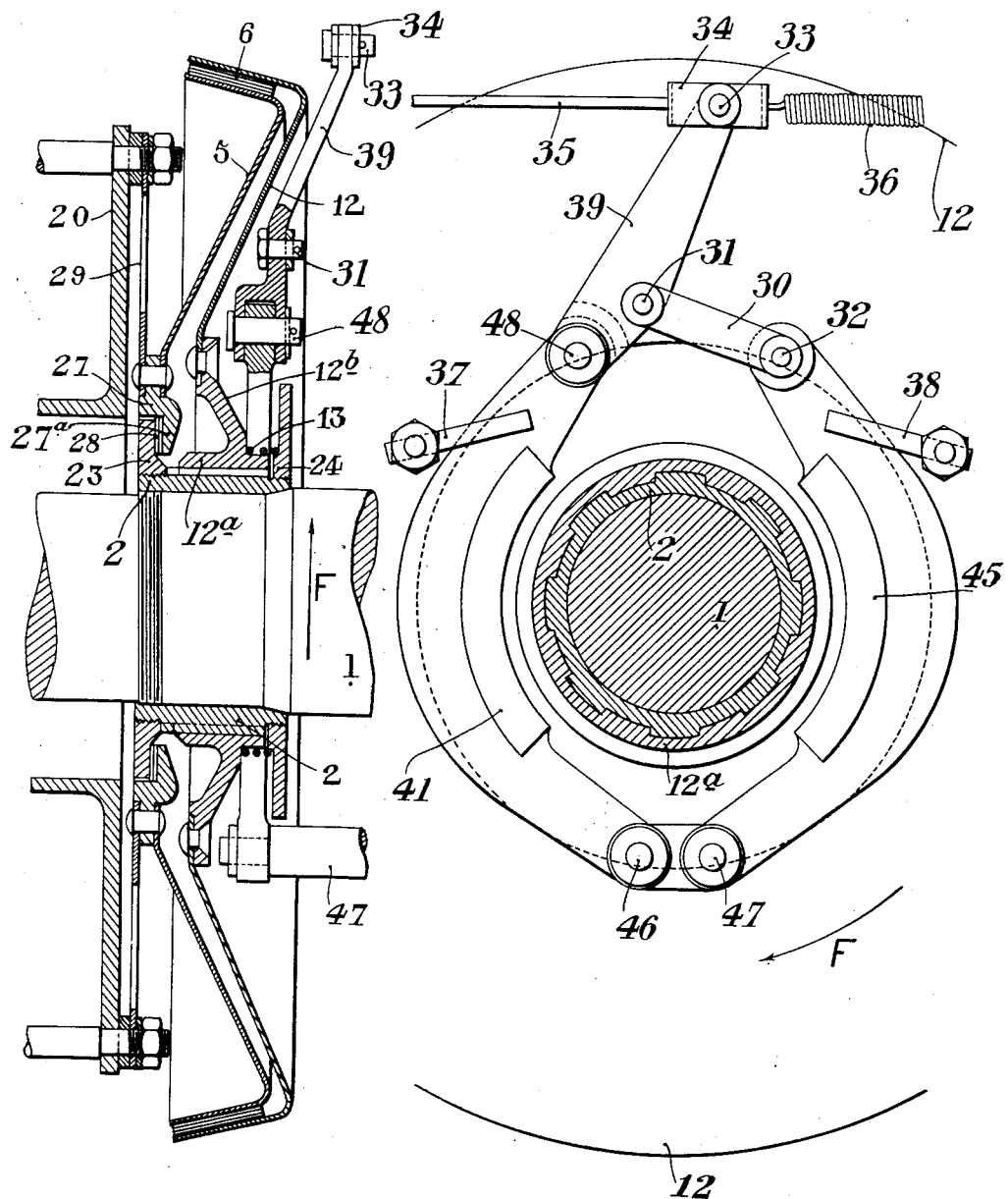

Patented Sept. 26, 1933

1,928,191

UNITED STATES PATENT OFFICE 1,928,191

FRICTION LOCKING DEVICE

Jean van Meurs, Paris, France, assignor to Société Anonyme Francaise du "Ferodo", Paris, France Application October 30, 1930, Serial No. 492,302, and in France November 26, 1929

3 Claims. (Cl. 192—48)

The present invention has for its object a friction clutch of the so-called "free wheel" type ensuring, on the one hand, the actuation in a single direction, by a driving shaft, of a member, and, on the other hand, the automatic disengagement when the driven member tends to rotate more quickly than the driving shaft.

Apparatus of this kind are known, comprising a friction clutch, one of the elements of which can screw on a screw-threaded portion of the driving or driven shaft, whilst the second element is rigid with the other shaft. According to the direction of relative rotation between both shafts, the clutch element carried by the said screw-threaded portion is screwed or unscrewed on the latter and moves towards or from the second element, thus ensuring the throwing in or out of engagement.

These apparatus are very frequently intended to be interposed between the engine and the propeller of airplanes. In fact, it is advantageous to release the propeller from the engine, when the airplane volplanes or dives, the gas admission being cut off. The propeller, which then rotates under the action of the relative wind, tends in fact to drive the engine and thus opposes a relatively considerable resistance to the advance of the airplane, whilst causing unbalancing of the latter.

It is also very desirable to be able to reestablish at will the connection between the propeller and the engine, for instance for starting the engine by means of the propeller, particularly when the air plane volplanes or dives and that the propeller rotates under the action of the relative wind.

The apparatus according to the invention, which comparatively to known apparatus presents numerous ameliorations which will appear from the following description, allows moreover to reestablish this connection between the propeller and the engine.

For that purpose, use is made of a conical clutch with interposition of a non-lubricated friction lining, the very high adherence torque of which allows of giving to the screw-thread a very long pitch, whilst having a sufficient driving torque; in this way, when the driven shaft rotates more rapidly than the driving shaft, the longitudinal reaction exerted on the movable clutch element and tending to move it backwards, for unclutching, is very reduced; the stress to be exerted for counter-balancing this reaction, when throwing into engagement is again to be effected, is consequently relatively small and of an admissible order of magnitude.

Moreover, this reaction can be completely annulled if the screwthread of the driving shaft, for instance, as well as the corresponding screwthread of the clutch element capable of screwing or unscrewing on the same, are constituted by teeth the front flank of which is oblique whilst the rear flank is straight; in this way, when the driven shaft rotates more rapidly than the driving shaft, no longitudinal reaction is exerted on the movable clutch element which can therefore be caused to slide without effort so as to effect the clutch.

Several forms of carrying out the subject matter of the invention are illustrated, by way of example, in the accompanying drawings, in which:

Fig. 1 is a longitudinal section of a first form of construction.

Fig. 2 is a cross section made according to line II—II of Fig. 1.

Figs. 3 and 4 diagrammatically illustrate the operation of the screw-threaded members.

Figure 5:
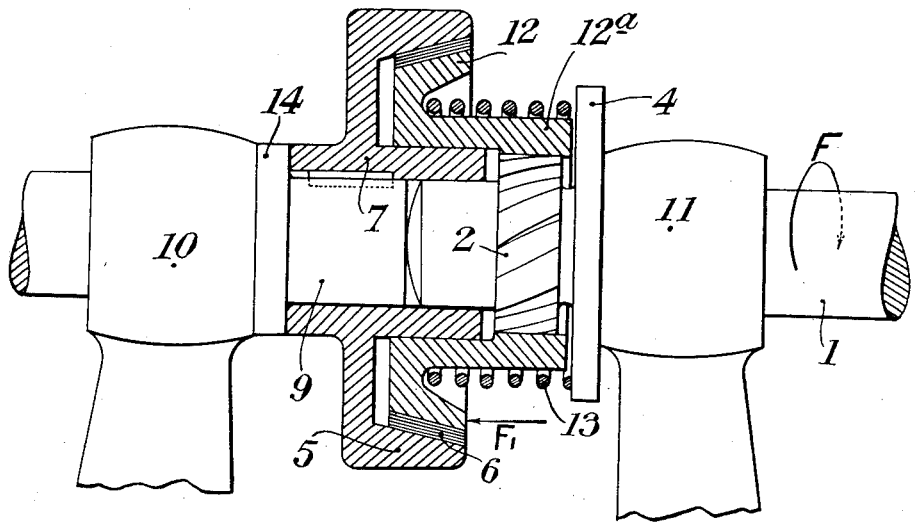

Fig. 5 is a longitudinal section of a second form of construction.

Fig. 6 is a longitudinal section of another form of construction comprising a hand-actuated clutch device.

Fig. 7 is a cross section thereof.

Figs. 8 and 9 illustrate details.

Figure 10:
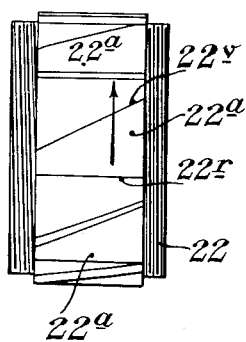

Fig. 10 shows a toothed crown of the driving shaft, the teeth of which have a straight flank and an oblique flank.

Figure 11:
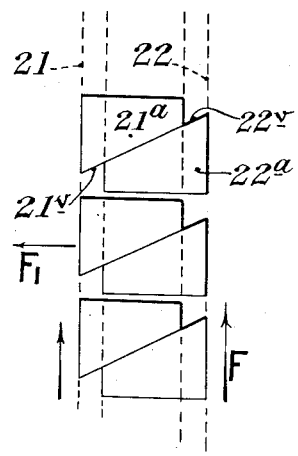
Figure 12:
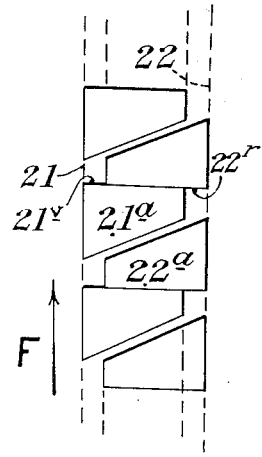

Figs. 11 and 12 diagrammatically illustrate the operation of this crown and of the corresponding member.

In Figs. 1 and 2, on the driving shaft 1 which rotates in the direction of the arrow F, are rigidly secured a fluted sleeve 2 (the flutes might be directly formed on the shaft 1), a thrust washer 3 and a thrust collar 4.

A first friction cone 5 is loosely mounted on the driving shaft 1, between the sleeve 2 and the thrust washer 3, with interposition of a friction lining 8 which facilitates the clutch engagement of this friction cone 5 with the shaft 1. The hub 7 of this friction cone 5 is extended in the direction of the fluted sleeve 2.

A second friction cone 12, loosely mounted on the hub 7 of the first friction cone, is constantly urged towards the latter by a spring 13 bearing on the collar 4. A lining 6, having a high friction coefficient, is interposed between both cones. The hub 12a of the cone 12 is provided with helical flutes which fit in the corresponding flutes 2 of the driving shaft 1.

When the driving shaft 1 rotates in the direction of the arrow F, the front flank $2v$ (Fig. 3) of the teeth of the sleeve 2 presses the rear flank $12r$ of the teeth of the hub $12a$ and causes the displacement of the cone 12 in the direction of the arrow $F_1$ (Figs. 1 and 3). As the permanent contact between the cones 12 and 5 is ensured by the spring 13, the coupling instantaneously takes place without any play and the cone 5 is driven with the members to which it is connected.

The connection between the cone 5 and the driven member can moreover be carried out in any suitable manner. This cone can itself constitute a toothed wheel or a pulley. In the example illustrated, it constitutes the hub adapted to directly receive the propeller of an airplane.

On the contrary, when the propeller rotates more rapidly than the engine, it is the front flanks $12v$ (Fig. 4) of the teeth of the hub $12a$ which press the rear flanks $2r$ of the teeth of the sleeve, this causing a backward movement of the cone 12 in the direction of the arrow $F_2$ and, consequently, unclutching. However, the strength of the spring 13 and the inclination of the flutes are so calculated as to constantly maintain a slight contact between both cones 5 and 12.

The form of construction illustrated in Fig. 5 differentiates from the preceding one only in that the cone 5, instead of directly carrying the member to be driven, is rigidly secured on the driven shaft 9 on which are secured the members to be driven. The end of the driving shaft 1 can freely rotate in the hub 7 of the cone 5. Both shafts 1 and 9 rotate in bearings 10 and 11 and their axial displacements are prevented by suitable abutments. The operation of this form of construction is the same as in the first case.

Fig. 6 illustrates another form of carrying out the subject-matter of the invention; in this form, a device has been provided to effect clutch engagement even if the driven members rotate more rapidly than the driving shaft.

The general arrangement of the parts is of the type of that diagrammatically illustrated in Fig. 1, that is to say the cone 5 carrying the propeller is loosely mounted on the driving shaft 1. The fluted sleeve 2 rigidly secured on this driving shaft 1, cooperates with similar flutes provided on the inner face of the sleeve $12a$, which carries the driving cone 12 pressed by the spring 13 against the driven cone 5 with interposition of the lining 6. The longitudinal sliding movement of the sleeve $12a$ is limited by two circular abutments 23 and 24 secured on the sleeve 2.

The driven cone 5 is secured on a ring 27 loosely mounted on the circular abutment 23 and having a shoulder $27a$ bearing against the abutment 23 through the medium of a friction lining 28. The ring 27 is connected to the inner cheek member of the propeller or of the propeller-carrying sleeve by a resilient web 29 which ensures the actuation whilst allowing a small axial movement of the ring 27.

The device allowing the clutch engagement to be effected by hand for starting the engine by the propeller, is composed of two jaws 41 and 45, (Figs. 6, 7 and 8), pivoted on fixed pivots 46 and 47, and the contact faces of which, can enter between the abutment 24 and a frustum-shaped face of the neck $12b$ of the sleeve $12a$.

On the end 48 of the jaw 41 is pivoted a control member 39 and a tension link 30 is pivoted, on one side, on a stud 31 of this lever, and, on the other side, on the pivotal stud 32 of the jaw 45.

The end 33 of the lever 39 is pivoted on a fork member 34, urged by the link 35 and returned by the spring 36. The guides 37, 38 (Fig. 9) hold the jaws 41 and 45 in their plane.

The operation of this apparatus is the same as that of the apparatus illustrated in Figs. 1 to 3. When the driving shaft 1 and its sleeve 2 rotate in the direction of the arrow F (Figs. 6 and 3), the front flanks $2v$ of the teeth 2 act on the rear flanks $12r$ of the teeth of the hub $12a$, thereby pushing the driving cone 12 towards the driven cone 5, so that the coupling automatically takes place.

On the contrary, when the propeller rotates more rapidly than the driving shaft 1, it is the front flanks $12v$ (Fig. 4) of the teeth of the hub $12a$ which act on the rear flanks $2r$ of the teeth of the sleeve 2, this exerting a backward thrust $F_2$ on the hub $12a$ and, consequently, effecting the throwing out of engagement.

When it is desired to use the rotation of the propeller, for instance after the airplane has volplaned, for re-starting the engine, the pull member 35 and the lever 39 are acted upon so as to insert the jaws 41 and 45 between the fixed circular abutment 24 and the conical collar $12b$ of the sleeve $12a$. From this fact, the sleeve $12a$ and the cone 12 are moved towards the cone 5 and the coupling takes place. The dimensions and shapes of the bearing surfaces of the parts 24, $12b$, 41, 45 are such that the jaws do not substantially hinder the rotation of the parts 24 and $12b$; for that purpose, said jaws may be moreover provided with anti-friction linings $45a$, $45b$ allowing them to slide between the parts 24 and $12b$.

For causing the hub $12a$ to move and the cones 12 and 5 to engage with each other, it is necessary to overcome the resistance of the reaction $F_2$ (Fig. 4) of the sleeve 2 of the hub $12a$. This reaction will be so much greater as the pitch of the flutes of the sleeve 2 and of the hub $12a$ is smaller; it would be impossible to overcome the resistance of the reaction $F_2$ with any of the apparatus known up to this day. The very high value of the adherence torque of the cones 5 and 12, with interposition of the non lubricated friction lining 6, allows of employing flutes having a very long pitch and, consequently, to diminish the value of this reaction $F_2$, whilst maintaining a sufficient value of the driving torque.

Moreover, the value of this reaction $F_2$ can be completely annulled, by employing, instead of the sleeve 2; the sleeve 22 illustrated in Fig. 10, the teeth $22a$ of which have their front flanks $22v$ inclined and the rear flanks $22r$ straight, the hub $12a$ being also replaced by a hub 21 the teeth $21a$ of which are correspondingly formed.

Fig. 11 shows that when it is the driving shaft 1 which acts as driving member by rotating in the direction of the arrow F, it is, as previously, the front flanks $22v$ of the teeth $22a$ of the sleeve 22 which act on the rear flanks $21v$ of the teeth $21a$ of the hub 21 and determine a thrust $F_1$ of the hub $12a$ which ensures the clutch engagement.

On the contrary, as shown in Fig. 12, when the propeller rotates more rapidly than the driving shaft 1, it is the front flanks $21v$ of the teeth $21a$ of the hub $12a$ which act on the rear flanks $22r$ of the teeth $22a$ of the sleeve 22. As these flanks are straight and parallel to the axis of the driving shaft 1, there is no longitudinal reaction $F_2$. The contact between the cones 5 and 12 is ensured by the pressure of the spring 13 which is however insufficient for transmitting an important driving torque. Disengagement therefore occurs, and the propeller is only slightly braked.

As there is no reaction $F_2$ to overcome for again effecting clutch engagement, it suffices to exert a very slight pull on the pull member 35 for obtaining this result and, consequently, for starting the engine by utilizing the rotation of the propeller as previously explained.

I claim—

1. In a free wheel clutch comprising a driving and a driven member, a crown wheel having helical teeth of very long pitch, rigid with one of these two members, a sleeve provided with inner helical teeth also of long pitch and meshing with the teeth of the crown wheel, a first conical clutch element rigid with this sleeve, a second conical clutch element cooperating with the first one and rigid with the other of these two members, a spring constantly pushing the first conical clutch element against the second one, a nonlubricated friction lining interposed between these two clutch elements, and means permitting axial movement of the sleeve in the direction for ensuring the throwing in engagement.

2. In a free wheel clutch having a driving and a driven member, a crown wheel having helical teeth of very long pitch, rigid with one of these two members, a sleeve provided with inner helical teeth also of long pitch and meshing with the teeth of the crown wheel, a first conical clutch element rigid with this sleeve, a second conical clutch element cooperating with the first one and rigid with the other of these two members, a spring constantly pushing the first conical clutch element against the second one, a nonlubricated friction lining interposed between these two clutch elements, a circular abutment on the crown wheel, an oblique collar on the sleeve, jaws, and means for inserting the said jaws between the said abutment and the said collar and causing the axial displacement of the sleeve in the direction for ensuring clutch engagement.

3. In a free wheel clutch having a driving and a driven member, a toothed crown wheel rigid with one of these two members, the front flank of the teeth of the said crown being oblique relatively to the direction of rotation, and the rear flank being straight, a sleeve internally provided with corresponding teeth, a first clutch element rigid with this sleeve, and a second clutch element rigid with the other of these two members.

JEAN van MEURS.